P. CROSTI.
MOUNTING FOR LOCOMOTIVES AND RAILWAY CARS.
APPLICATION FILED MAY 11, 1914.
1,202,808.
Patented Oct. 31, 1916.
3 SHEETS—SHEET 1.
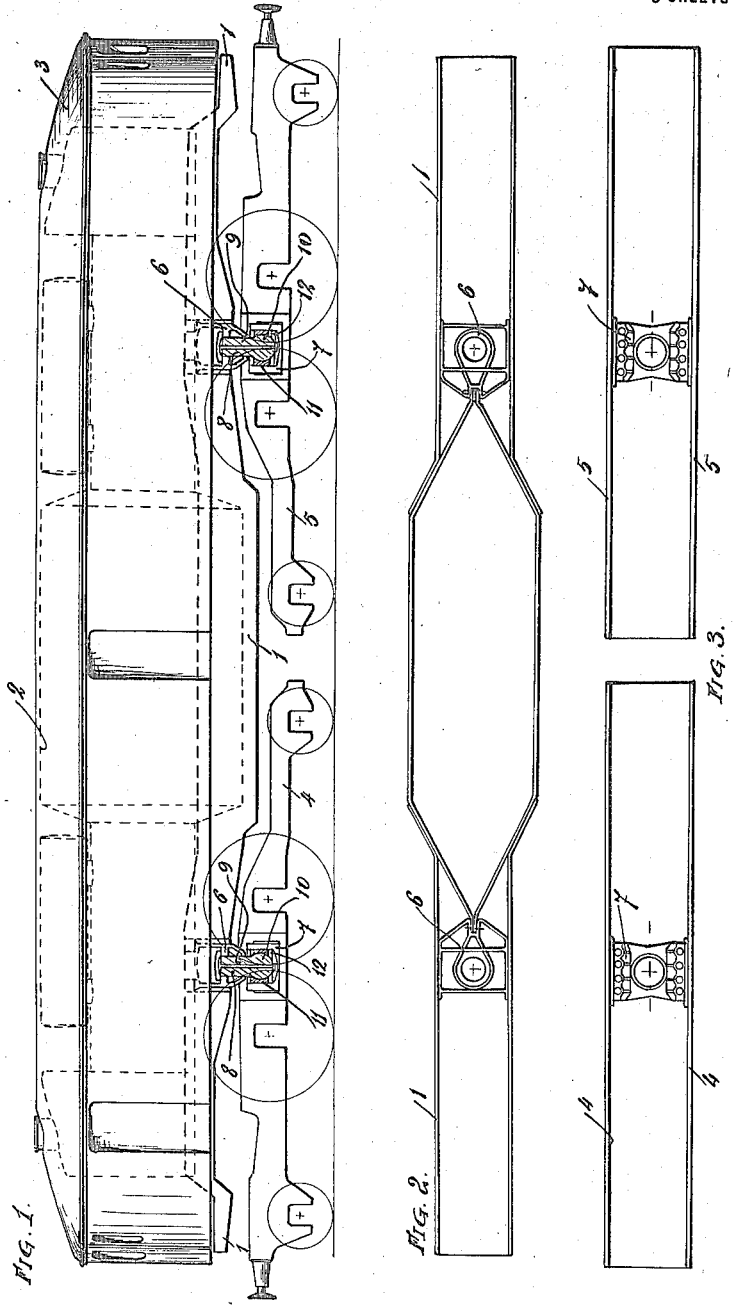

P. CROSTI.
MOUNTING FOR LOCOMOTIVES AND RAILWAY CARS.
APPLICATION FILED MAY 11, 1914.
1,202,808.
Patented Oct. 31, 1916.
3 SHEETS—SHEET 2.
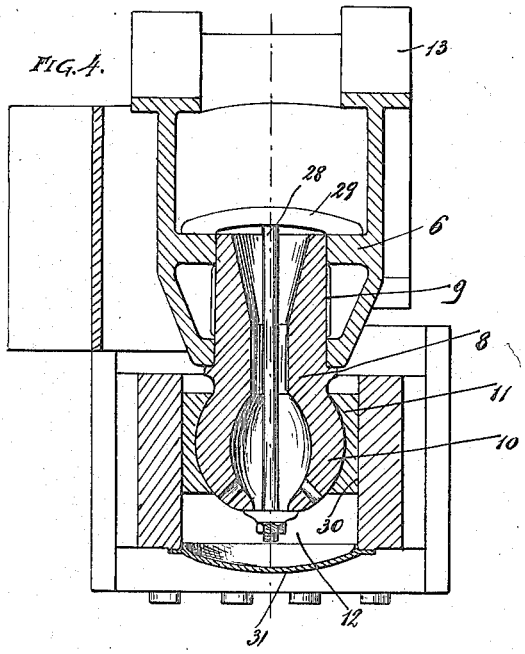
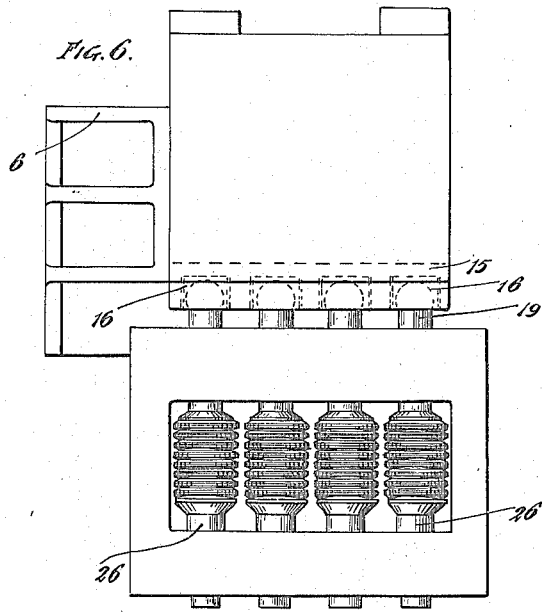
Witnesses:
E. G. McGee
Edward R. Whitman
Inventor.
Pietro Crosti.
By Emil Bönnelycke
Attorney.

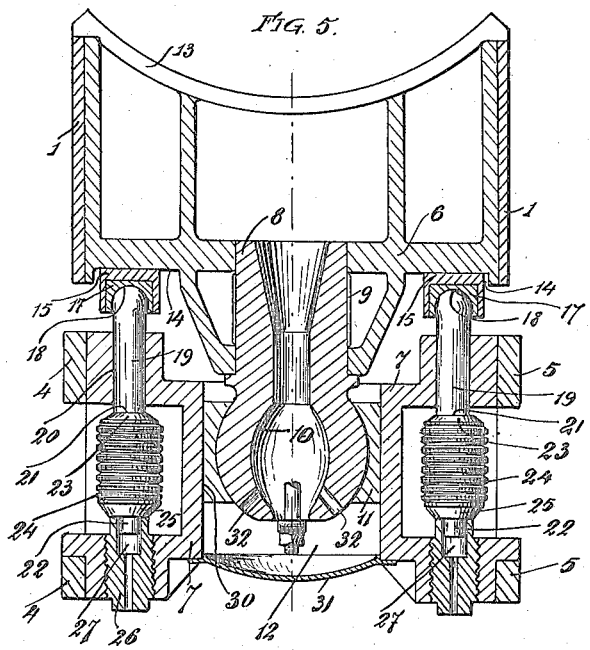

UNITED STATES PATENT OFFICE.

PIETRO CROSTI, OF MILAN, ITALY.

MOUNTING FOR LOCOMOTIVES AND RAILWAY-CARS.

1,202,808.

Specification of Letters Patent.

Patented Oct. 31, 1916.

Application filed May 11, 1914. Serial No. 837,795.

*To all whom it may concern:*

Be it known that I, PIETRO CROSTI, subject of the King of Italy, resident of Milan, in the Kingdom of Italy, have invented new and useful Improvements in Mountings for Locomotives and Railway-Cars, of which the following is a specification.

The present invention proposes an improved mounting for locomotives and for railway cars in general, and it resides in the provision of a swinging joint between the parts which support the locomotive or car which is so constructed as to secure the independent movement of the said parts and to avoid, as far as possible, all causes of strains, wear and breakdown that might arise either from the different relative positions which such parts may take, from jolts and sudden obstacles, or from the relative asynchronous oscillations of different amplitudes of the said parts with respect to one another.

The annexed drawings show by way of example an embodiment of the invention as applied to a locomotive.

Figure 1 is a side view of the said locomotive. Fig. 2 is a plan view of the boiler supporting girder. Fig. 3 is a plan view of the two truck bodies. Figs. 4 and 5 are sections through a swinging joint at right angles with one another. Figs. 6 and 7 are two external views of the swinging joint.

It is obvious that the invention can be applied, in like manner to passenger and freight cars and, generally, in any connection in which swinging joints are required.

In Fig. 1 are shown diagrammatically the girder 1 carrying the boiler 2, which is shown in dotted lines, the locomotive casing 3, and the two truck bodies 4 and 5, which, in the case of locomotives, together with the wheels and gear (not shown on the drawing) make up the two trucks. To girder 1 are fixed the frames 6—6; to the two truck frames 4 and 5 are fixed the two frames 7—7. The support or suspension (on the drawing a support is shown) of the rigid girder 1 on or from the two truck bodies 4 and 5 is effected by means of interposed springs, while the swinging joints are obtained through two specially-constructed bolts 8—8 which, however, are so arranged as to carry no load. The cylindrical upper portion 9 of each of these bolts can be fixed either to a frame 6, or to a frame 7 (on the drawing it is secured to frame 6) where as the spherical lower portion or head 10 is mounted to turn in a socket 11 which is arranged in a chamber 12 provided in the frame 7.

In Figs. 4 to 7 is shown diagrammatically one of the two metallic frames 6—6 secured to the sides of girder 1; these frames 6—6 with their saddle shaped surface 13 form rests for boiler 2. The surfaces 14 afford supports for the slides 15 (on the drawing two are shown for each frame 6). In each slide 15 there are recesses 16 (on the drawing four recesses are shown for each slide), in which bushings 17 are fitted, provided with spherical sockets 18 which receive the spherical heads of the bolts 19, these bolts having their shanks slidably mounted in openings 20 in the two frames 7—7. The lower ends 21 of bolts 19 are carried respectively by studs 22 whose heads 23 cause the superincumbent weight to be taken up by the springs 24, which latter in turn rest (with or without the interposition of washers 25 or the like) on studs 26 screwed into the frames 7—7 in order to permit said springs to be readily and easily replaced.

The portion 9 of each of the bolts 8 is shown as being held in place by clamp 29 and bolt 28.

The cylindrical external surface 30 of socket 11 has a sliding fit in the chamber 12.

In the arrangement shown, the slots 32 in the spherical head 10 of bolt 8 enable the lubricant to flow therethrough while the bolt is turning, the lubricant being caught in a dished plate located at the bottom of chamber 12.

The form, number and relative position of the various parts may vary, the invention not being limited to any of them.

Having now described my invention and how the same is to be carried out, what I claim as my invention, is:

1. A mounting for locomotives and railway cars, comprising a girder whereon the body of the locomotive rests; a plurality of independently-movable trucks for supporting said girder, each truck provided with a rigid frame having a chamber therein; a swinging-joint connection between each truck and the adjacent portion of the girder, each of such connections embodying a depending bolt connected at its upper end to the girder and provided at its lower end with a spherical head, and a member slidable vertically in the chamber in the adjacent truck frame and provided with a spherical socket wherein the head of said bolt rotatably fits; and yielding supporting devices intermediate said girder and said trucks.

2. A mounting for locomotives and railway cars comprising a girder whereon the body of the locomotive or car is adapted to rest; a pair of trucks disposed beneath the end portions of the girder, said trucks and girder ends constituting companion parts, one of which is provided with a vertical chamber and with a socket element slidably fitting therein; a pair of vertical bolts provided at one end with spherical heads rotatably fitting in the respective socket elements and having their other ends attached to the adjacent girder ends; and yielding supporting devices intermediate said girder and said trucks.

3. A mounting for locomotives and railway cars comprising a girder whereon the body of the locomotive or car is adapted to rest; a pair of trucks having swinging-joint connections with the end portions of said girder, each truck being provided with a plurality of vertical openings; a plurality of spring-controlled bolts movable endwise through said openings and rounded at one end; and bushings carried by said girder and provided with sockets wherein the rounded ends of said bolts fit.

4. A mounting for locomotives and railway cars comprising a girder whereon the body of the locomotive or car is adapted to rest; a pair of trucks having swinging-joint connections with the end portions of said girder, each truck being provided with a plurality of vertical openings; spring-controlled bolts movable through said openings and rounded at one end; slides arranged against one face of the girder and provided with recesses; and bushings fitted in said recesses and having sockets for the reception of said bolt ends.

In testimony whereof I hereunto affix my signature in the presence of two witnesses.

PIETRO CROSTI.

Witnesses:
B. CARLO SALVOTI,
LYLE ROBB.